United States Patent
Testa, Jr.

[11] Patent Number: 5,882,155
[45] Date of Patent: Mar. 16, 1999

[54] CEILING TILE CUTTING APPARATUS

[76] Inventor: Vincent M. Testa, Jr., 56 Newburyport Turnpike, Ipswich, Mass. 01938

[21] Appl. No.: 844,834

[22] Filed: Apr. 22, 1997

Related U.S. Application Data

[63] Continuation-in-part of Ser. No. 361,573, Dec. 22, 1994, Pat. No. 5,622,463.

[51] Int. Cl.⁶ .................................................. B23C 9/00
[52] U.S. Cl. ...................... 409/132; 83/468; 144/252.1; 144/286.1; 144/136.95; 409/137; 409/138; 409/182; 409/218; 409/219
[58] Field of Search .................................. 83/468, 468.3, 83/468.6, 468.7, 474, 581; 144/252.1, 286.1, 135.2, 136.95, 154.5; 409/131, 132, 137, 138, 174, 182, 184, 209, 214, 218, 219

[56] References Cited

U.S. PATENT DOCUMENTS

| | | | |
|---|---|---|---|
| 1,942,873 | 1/1934 | Narrow | 83/581 |
| 3,738,211 | 6/1973 | Carter, Sr. | 83/468.3 |
| 3,770,031 | 11/1973 | Olson | 144/136 R |
| 4,630,656 | 12/1986 | Collins | 409/182 |
| 4,641,556 | 2/1987 | Vigneron et al. | 83/468 |
| 4,735,531 | 4/1988 | Boerckel et al. | 144/136.95 |
| 4,895,483 | 1/1990 | Anderson | 409/132 |
| 4,920,845 | 5/1990 | Blanchette | 83/581 |
| 4,939,968 | 7/1990 | Stoof | 83/468 |
| 4,965,935 | 10/1990 | Bourque | 33/26 |
| 4,974,306 | 12/1990 | Cole et al. | 83/468 |
| 5,016,508 | 5/1991 | Hallenbeck | 83/474 |
| 5,145,297 | 9/1992 | McGrath, Jr. | 409/137 |
| 5,456,559 | 10/1995 | Taylor | 409/137 |
| 5,582,225 | 12/1996 | Schank | 144/252.1 |
| 5,584,620 | 12/1996 | Blickhan et al. | 144/252.1 |
| 5,611,378 | 3/1997 | Brazell | 144/252.1 |
| 5,722,473 | 3/1998 | Tucker | 144/286.1 |

FOREIGN PATENT DOCUMENTS

205261  11/1967  Russian Federation ............ 144/135.2

Primary Examiner—Andrea L. Pitts
Assistant Examiner—Christopher Kirkman
Attorney, Agent, or Firm—Don Halgren

[57] ABSTRACT

The present invention comprises a ceiling tile cutting apparatus for the cutting and edging of successive tiles with corresponding angular cuts in a corresponding manner. The apparatus comprises a plurality of vertically arranged support legs connected by a plurality of horizontal members and a planar table member of generally rectilinear configuration attached at the upper end of the support legs. The table member has a first or proximal edge, a second or distal edge parallel to the first edge, a left hand edge and a right hand edge generally parallel to the left edge. An elongated slot extends through the table member parallel to the right hand edge of the table. A pair of guide rails supported over the elongated slot, and a motorized cutting tool mechanism is arranged to slide on the guide rails, with a cutting tool extending into the slot. An adjustable telescopable ruler is pivotably arranged on the table. The ruler has a first pivot axis location and a second pivot axis location to permit the adjustable ruler to guide tiles on the table from a plurality of base locations and allow tiles to be cut more efficiently.

14 Claims, 8 Drawing Sheets

CEILING TILE CUTTING APPARATUS

BACKGROUND OF THE INVENTION

1. Field of the Invention

This invention relates cutting tables, and more particularly tables which can be adapted for the cutting of ceiling tiles thereon, the present application being a continuation-in-part of copending U.S. patent applications Ser. No. 08/361,573 filed Dec. 22, 1994, now U.S. Pat. No. 5,622,463 which is incorporated herein by reference, in its entirety.

2. Prior Art

In the construction industry today, the ceiling tiles used in buildings are often measured and cut by hand using any straightedge, such as the side of a second tile, and the razor blade. This type of method results in mismatched ceiling tiles that requires having to do the same measurements again for each particular tile being cut and aligned with those which it may have to mate. These operations are often dusty, difficult to maintain uniform angles, and at best time consuming and cumbersome for the contractor involved.

It is an object of the present invention to provide an improved ceiling tile cutting table which may be used with a minimum of repetitive effort to get similar cutting angles accurately placed on those tiles being cut.

It is a further object of the present invention to provide an improved ceiling tile cutting table which minimizes the contamination of the environment by minimizing the dust escaping therefrom.

BRIEF SUMMARY OF THE INVENTION

The present invention comprises a multi-functional acoustical tile cutting system comprising a tile cutting table arranged for ease of cutting similar angles for successive tiles so as to minimize any problems in making successive angular cuts, and minimize any environmental problems therewith.

The acoustical tile cutting assembly includes a lower frame having a plurality of vertically disposed legs with a lower end, each of which has a rotatable wheel disposed thereon. The frame assembly has a plurality of horizontally disposed crossbars which support a planar table surface. The table surface is of rectilinear configuration having two pairs of parallel sides, one pair of parallel sides may be somewhat longer than the other pair of parallel sides. Each leg is telescopable and has locking pins therein, so as to permit the raising and lowering of the surface of the table to which its respected upper ends are attached. The table has a first or proximal side and a second parallel or distal side edge. The table has a left-hand side edge and a parallel right-hand side edge.

An elongated slot is cut through the thickness of the table, generally close to and parallel to the right-hand side edge thereof. The slot extends almost the full length of the right side of the table. A pair of rail guides are disposed parallel to and slightly above the upper surface of the table adjacent to the long edges of the slot. A guide rail bracket is attached to each end of the pairs of guiderails, each bracket having a lower edge which is fixedly secured to the first proximal and second distal edge respectively, of the table. The guide rails are in longitudinal alignment with the elongated slot.

A carriage base is slidingly disposed between the guiderails. The carriage base comprises a generally rectangular frame having a central opening disposed therethrough. The carriage base has a hose support base attached to one side thereof. The hose supporter base has a central opening therethrough. The opening in the carriage base and the opening in the hose support base, are each in alignment with the elongated slot cut through the table. An electrically empowered router is mountable onto the carriage base. A face plate stands upwardly from the carriage base, and has a slot for a mounting screw extending therethrough. The mounting screw is mateable with a threaded opening at the base of the router. The tightenable screw in the slot permits the height of the router to be adjusted with respect to the surface of the table, or to the surface of any tile being cut. The router has a cutting tool or bit which extends through the opening in the carriage base and into the slot within the table. The hose support base has an annular flange extending around its central opening. The annular flange mates with a hose adapter cap for insertion thereover. The hose adapter cap is in fluid communication with a flexible hose.

A hose bracket extends off of the rail guide bracket arranged at the distal edge of the table. The hose bracket comprises a pair of flexible side arms and a central annular support ring. The flexible hose extends slidingly through the hose support ring, the hose extending into a vacuum container supported on the lower side of the frame assembly. The side arms of the hose support bracket are flexible, so as to permit lateral movement of the hose and the bracket, with respect to the table. An arrangement of rivets are attached to the lower side of the table, adjacent to the elongated slot. A generally U-shaped trough, having an L-shaped shoulder along each upper edge thereof, is flexibly arranged so as to snap into engagement with the rivets in the underside of the table to which they are attached. The snap-in trough has a wall at each end, so as to provide an enclosed dust receptacle beneath the router and the table. A power receptacle with an on/off switch, is attached to the lower side of the table at one end thereof. The power receptacle has an extension cord to provide electrical power to the receptacle from a power source. The receptacle has electrical cords which run to the router on the top of the table and to the vacuum cleaner supported on the frame beneath the table. The vacuum may have its own on/off switch. A pair of brackets are arranged between spaced apart transverse members between the legs, so as to permit the vacuum container to be secured in a vertical orientation therebetween. A bungee cord may be utilized to hold the vacuum container to those brackets. In a further embodiment, the vacuum container may be disposed in a horizontal arrangement with the bungee cord holding the vacuum container to lower frame components. The bracket may be moved so as to hold the vacuum directly under the middle of the table or under the distal edge of the table.

A locking knob may be arranged through a side of the carriage base, so as to lock the carriage base and the router into a particular longitudinal location on the guiderail assembly. The outermost guiderail may have a ruled graduated surface marked on its uppermost surface to permit the measured adjustment of tiles being cut thereby. The locking knob also permits the router assembly to be fixedly locked thereon, permitting a tile to be pushed with respect to the stationary router itself, instead of the router being pushed with respect to a tile thereadjacent or thereunder.

A telescopable adjustable rule is arrangeable, generally parallel to the first or proximal edge of the table. The telescopable rule is pivotally attached at a first location at the right-hand side of the table, adjacent to the rail guide. The adjustable rule has a distal end with a z-bracket thereon. A locknut is disposed through the distalmost end of the lower side of the adjustable rule and into the z-bracket, so as to lock the z-bracket against the lower edge of the table. The adjustable guide has a pin on its proximal end, which pin is insertable through a corresponding mating hole alongside the rail guide. The adjustable rule may be placed at second or other locations on the upper surface of the table, by implacement of its pivot pin therein.

The adjustable rule therefore, may be locked into any angular orientation on the table, from a position adjacent to the first or proximal edge, or from a position adjacent to the distal or second edge thereof. By locking in the adjustable rule utilizing the lock knob and the z-bracket thereat, successive corresponding angular cuts may be made by moving the router along the rail guide while a tile is held in place at the angular disposition of the rail guide.

The carriage base and router assembly, by virtue of its lock knob tightenable against the rail guide assembly, may permit the router assembly to be locked at any particular location thereacross. With the adjustable rule locked against the left-hand side edge of the table, the tiles themselves, may be slid across the adjustable roule so as to permit the tiles to be moved with respect to the router and not the router with respect to the tiles. Thus, in that manner, long edges of tiles may be cut with the tiles sliding between the rail guide and the upper surface of the table while the router is being held stationary. Very long tile members may be easily cut in that manner.

The invention thus comprises a ceiling tile cutting apparatus for the cutting and edging of successive tiles with corresponding angular cuts in a corresponding manner, the apparatus comprising a plurality of vertically arranged support legs connected by a plurality of horizontal members. A planar table member of generally rectilinear configuration is attached at the upper end of the support legs, the table member having a first or proximal edge, a second or distal edge parallel to the first edge, a left hand edge and a right hand edge generally parallel to the left edge. An elongated slot extends through the table member parallel to the right hand edge of the table member, and a pair of guide rails are supported over the elongated slot.

A motorized cutting tool mechanism is arranged to slide on the guide rails, with a cutting tool extending into the slot. An adjustable telescopable ruler is pivotably arranged on the table, the ruler having a first pivot axis location and a second pivot axis location to permit the adjustable ruler to guide tiles on the table from a plurality of base locations and allow tiles to be cut more efficiently.

The ceiling tile cutting apparatus a includes a flexible hose attached to a base of the cutting tool mechanism, the flexible hose being connected to a vacuum member. A bracket is arranged at each end of the guide rails to connect the rails to the first and second edges of the table. A flexible hose-support is attached to the bracket at the second edge of the table member, the hose-support being longitudinally centered on the guide rails to receive the vacuum hose therethrough from the tool cutting mechanism, and permit the vacuum hose to move slightly during operation of the cutting tool mechanism. The ceiling tile cutting apparatus includes a flexible trough releasably attached to the lower side of the table adjacent the elongated slot, to peremit the trough to be flexed for removal from securement brackets adjacent the lower side of the elongated slot. A locking nut is arranged between the tool cutting mechanism and the guide rails to permit the tool cutting mechanism to be locked stationary onto the guide rails, and a tile moved relative thereto, for cutting tiles of long dimensions. A graduation rule is arranged on one of the guide rails so as to permit accurate setting and repeatability of locating the cutting tool mechanism thereon.

The cutting tool mechanism comprises a carriage base arranged to slide on the guide rails, the base having a mounting bracket thereon which permits vertical adjustability of a router tool with respect to the bracket. The carriage base has a hose adapter plate attached thereto, to permit the vacuum hose to be held adjacent cutting tool as it moves on the guide rails, so as to maximize any dust pickup thereby.

A vacuum generator is supportable in a nesting orientation in the frame assembly beneath said table, or in an upright orientation adjacent the support frame on a pair of brackets secured to the frame assembly.

The invention also includes a method of cutting successive ceiling tiles in a common manner, comprising the steps of supporting a table on a frame assembly, forming an elongated slot through the table along one side edge thereof, mounting an adjustable cutting tool assembly on a pair of guide rails supported above the elongated slot in the table, arranging an adjustable telescopable rule on the table to guide a tile therealong at a particular desired angle with respect to the guidrails, locking stationary the cutting tool assembly onto the guide rails at a particular location; and pushing a tile to be angularly cut along the adjustable telescopable rule and under the guide rails with the cutting tool assembly thereon, so as to move the tile with respect to the stationary cutting tool assembly to permit successive tiles to be cut at the same angle.

The method further includes the steps of moving the adjustable rule to a second pivot location on the table, so as to permit the adjustable rule to pivot thereon from a diferent location, and allow a different cut to be made into a tile, attaching a vacuum hose to the cutting tool assembly, and a trough under the elongated slot in the table, so as to vacuum dust from the cutting operation as a tile is pushed thereadjacent, and flexing the trough so as to remove the trough from attachment to the table, so as to permit the complete removal of any dust not vacuumed through the hose.

BRIEF DESCRIPTION OF THE DRAWINGS

The objects and advantages of the present invention will become more apparent, when viewed in conjunction with the following drawings in which.

DESCRIPTION OF THE PREFERRED EMBODIMENTS

The present invention as shown in FIGS. 1–19, comprises a multi-functional acoustical tile cutting assembly with a tile cutting table 22 arranged for ease of cutting similar angles for successive tiles "T" so as to minimize any problems in making successive angular cuts, and minimize any environmental problems therewith.

Figure 1:
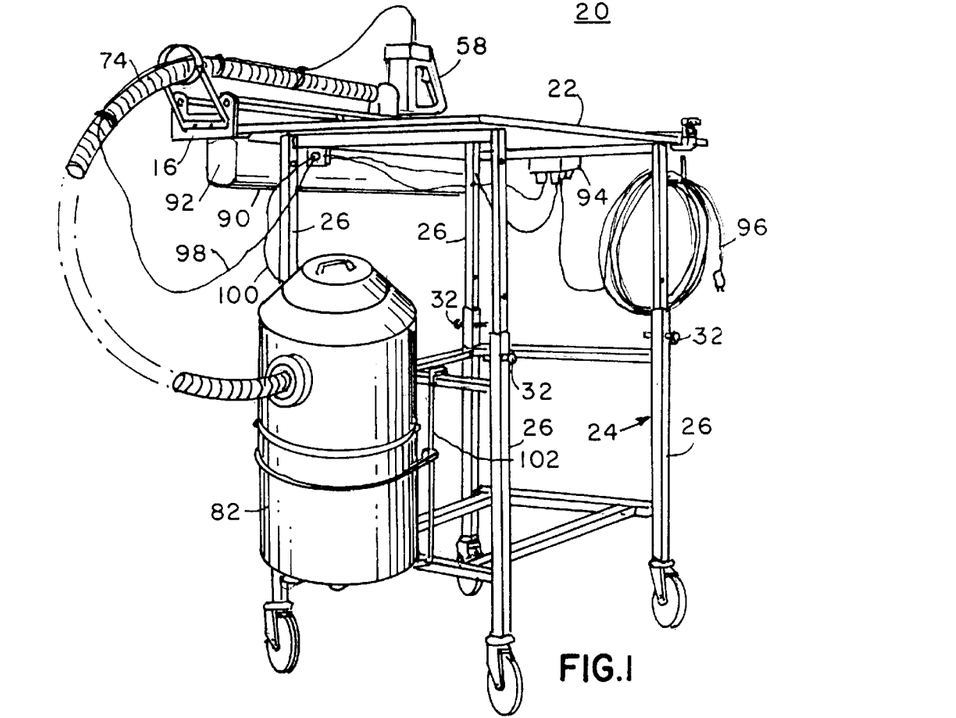
FIG. 1 is a perspective view of a ceiling tile cutting system, shown from a lower elevation.
Figure 2:
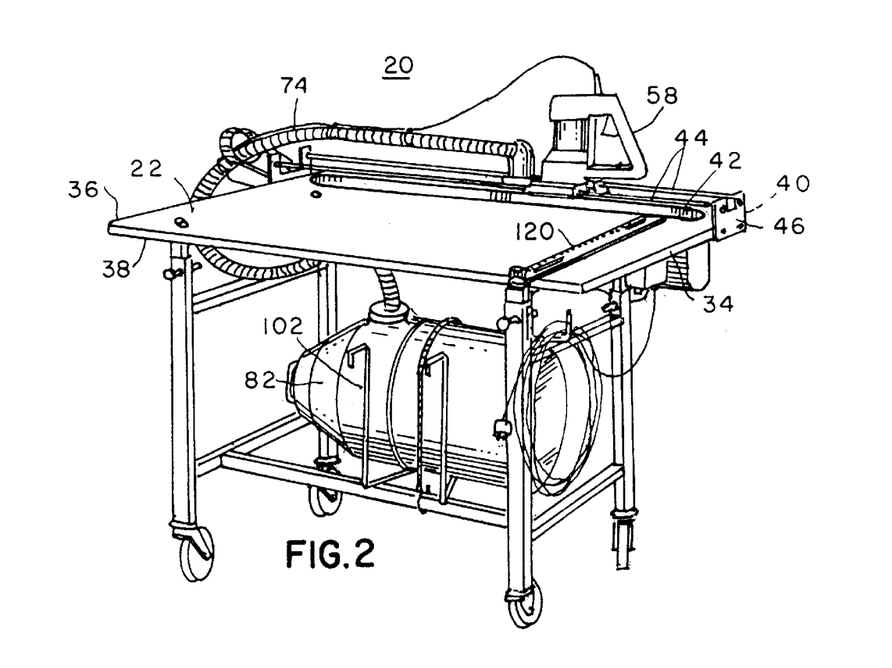
FIG. 2 is a view similar to FIG. 1, from a slightly higher elevation showing the ceiling tile cutting assembly and vacuum in a storage configuration.
Figure 3:
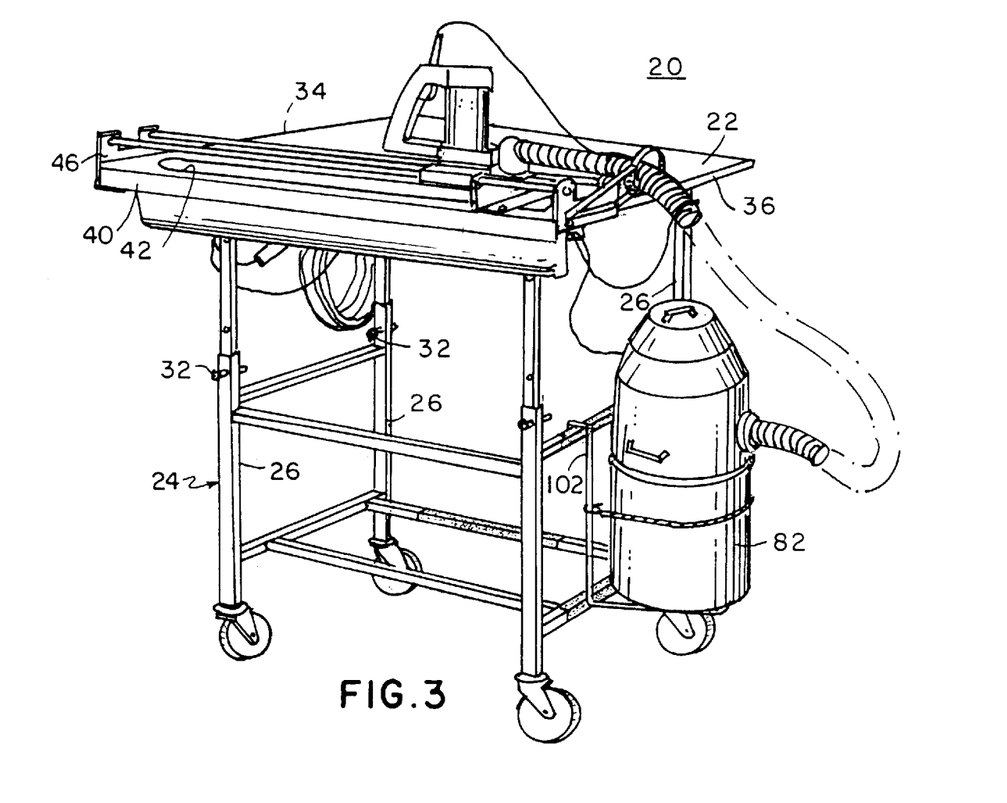
FIG. 3 is a view similar to FIG. 1, showing the ceiling tile cutting system from a different perspective.

The acoustical tile cutting assembly 20 includes a lower frame 24 having a plurality of vertically disposed legs 26, each with a lower end, each of which has a rotatable wheel 28 disposed thereon as may be seen in FIGS. 1–3. The frame 24 has a plurality of horizontally disposed crossbars 30 which support the planar table 22. The table 22 is of rectilinear configuration having two pairs of parallel sides, one pair of parallel sides may be somewhat longer than the other pair of parallel sides. Each leg 26 is telescopable and has locking pins 32 therein, so as to permit the raising and lowering of the surface of the table 22 to which its respective upper ends are attached. The table 22 has a first or proximal side edge 34 and a second parallel or distal side edge 36. The table 22 has a left-hand side edge 38 and a parallel right-hand side edge 40.

An elongated slot 42 is cut through the thickness of the table 22, generally close to and parallel to the right-hand side edge 40 thereof. The slot 42 extends almost the full length of the right side 40 of the table 22, as may be seen in FIGS. 6–9. A rail guide 44 is disposed parallel to and slightly above the upper surface of the table 22 adjacent to the long edges of the slot 42. A guide rail support bracket 46 is attached to each end of the rail guide 44, each bracket 46 having a lower edge which is fixedly secured to the first proximal and second distal edge 34 and 36 respectively, of the table 22. The rail guide 44 is in longitudinal alignment with the longitudinal axis of the elongated slot 42.

Figure 4:
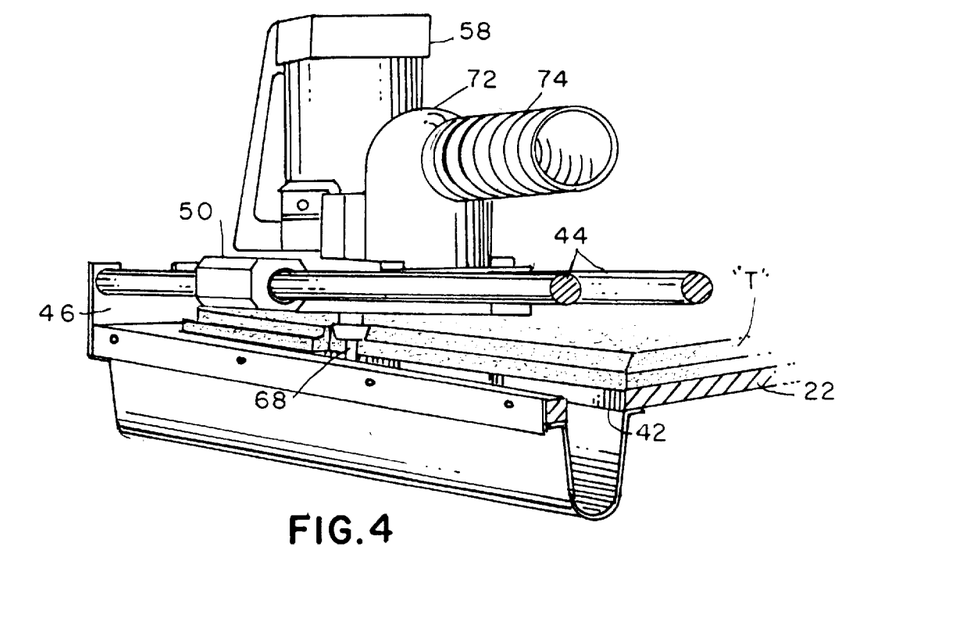
FIG. 4 is a perspective view, partly in section, showing a portion of the table, the dust trough, and the router end hose vacuum assembly.
Figure 5:
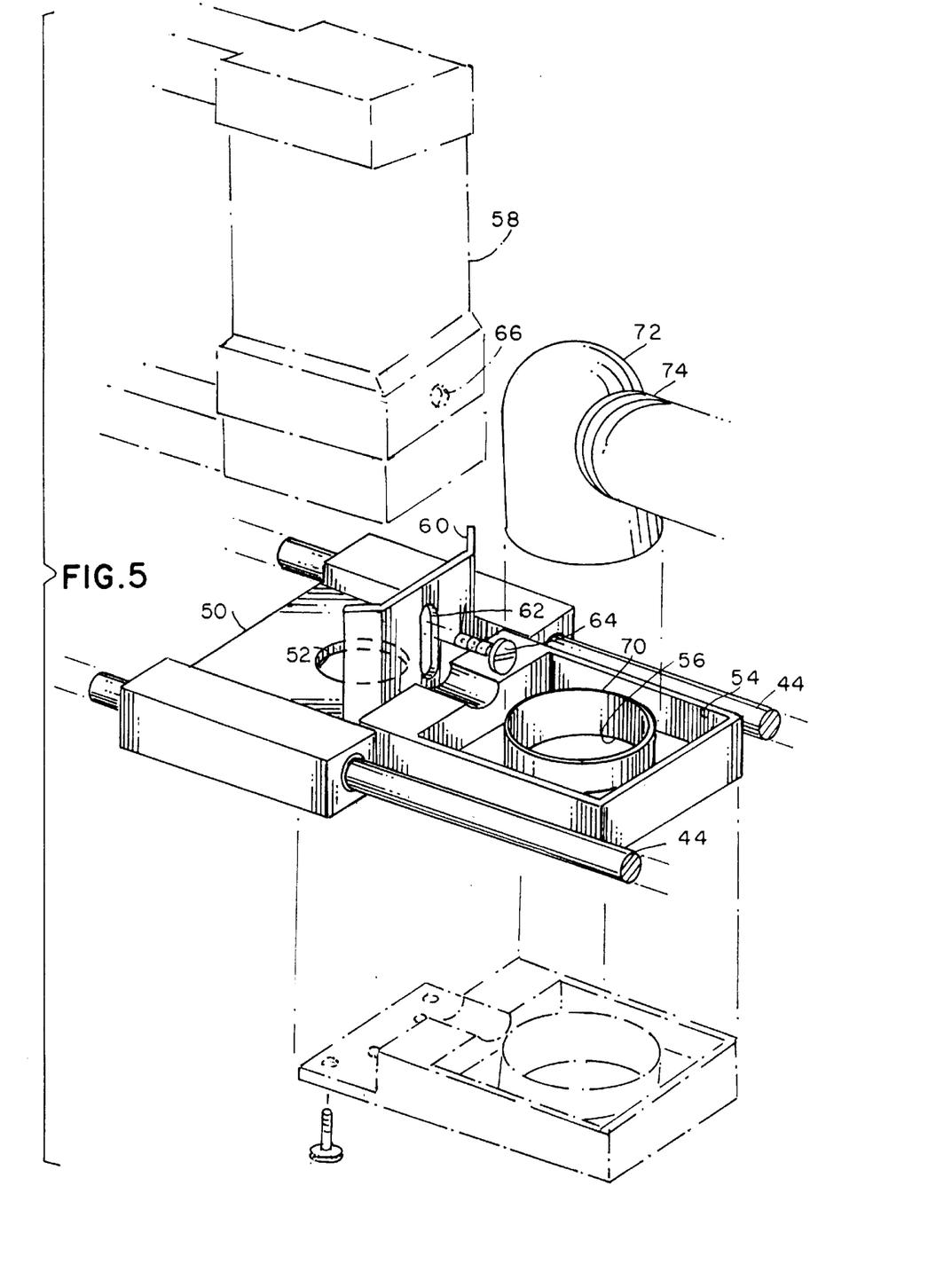
FIG. 5 is an exploded view of the router assembly and the hose support adapter and portions of the rail guides.

A carriage base 50, shown in FIGS. 4 and 5, is slidingly disposed on the rail guide 44. The carriage base 50 comprises a generally rectangular frame having a central opening 52 disposed therethrough. The carriage base 50 has a hose support base 54 attached to one side thereof. The hose support base 54 has a central opening 56 therethrough. The opening 52 in the carriage base 50 and the opening 56 in the hose support base 54 are each in alignment with the elongated slot 42 cut through the table 22. An electrically empowered router 58 is mountable onto the carriage base 50. A face plate 60 stands upwardly from the carriage base 50, and has a slot 62 for a mounting screw 64 extending therethrough. The mounting screw 64 is mateable with a threaded opening 66 at the base of the router 58, to permit the router 58 and a cutting tool bit 68 to be adjusted vertically with respect to the surface of the table 22 or to the upper surface of a tile "T" being cut thereon. The cutting tool 68 extends through the opening 52 in the carriage base 50 and into the slot 42 within the table 22. The hose support base 54 has an annular flange 70 extending around its central opening 56. The annular flange 70 mates with a hose adapter cap 72 for insertion thereover. The hose adapter cap 72 is in fluid communication with a flexible hose 74, which is attached to a powered vacuum container 82.

Figure 15:
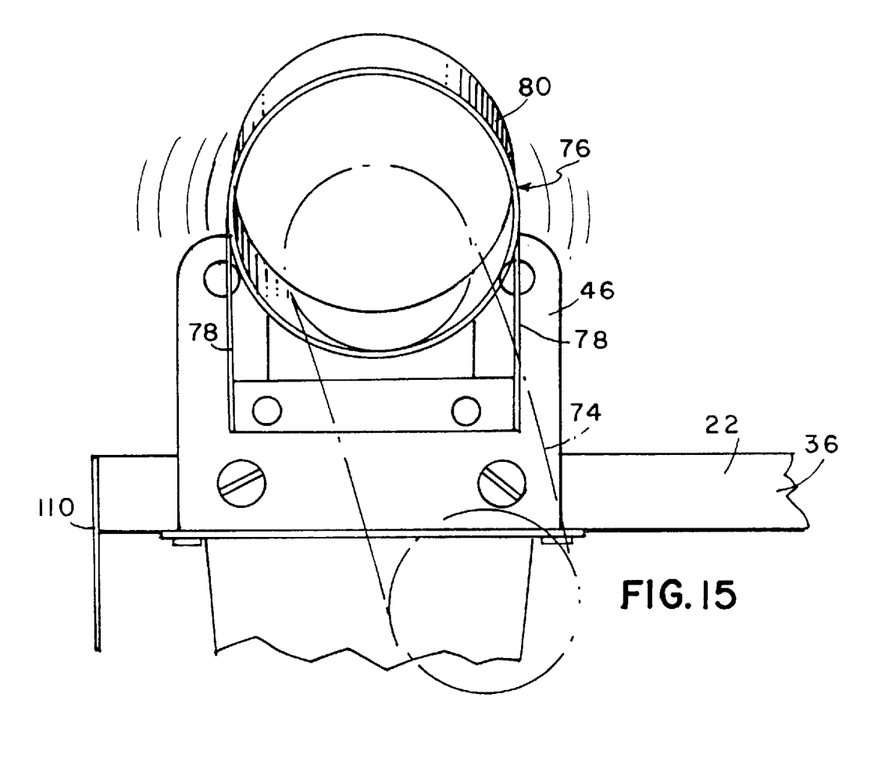
FIG. 15 is a side elevational view of a portion of the table with the rail bracket and hose support bracket thereon.

A hose bracket 76, as shown in FIG. 15, extends off of the rail guide bracket 46 arranged at the distal edge 36 of the table 22. The hose bracket 76 comprises a pair of flexible side arms 78 and a central annular support ring 80. The flexible hose 74 extends slidingly through the hose support ring 80, the hose 74 extending into the vacuum container 82 supported on the frame assembly 24. The side arms 78 of the hose support bracket 76 are flexible, so as to permit lateral movement of the hose 74 and the bracket 76, with respect to the table 22.

Figure 16:
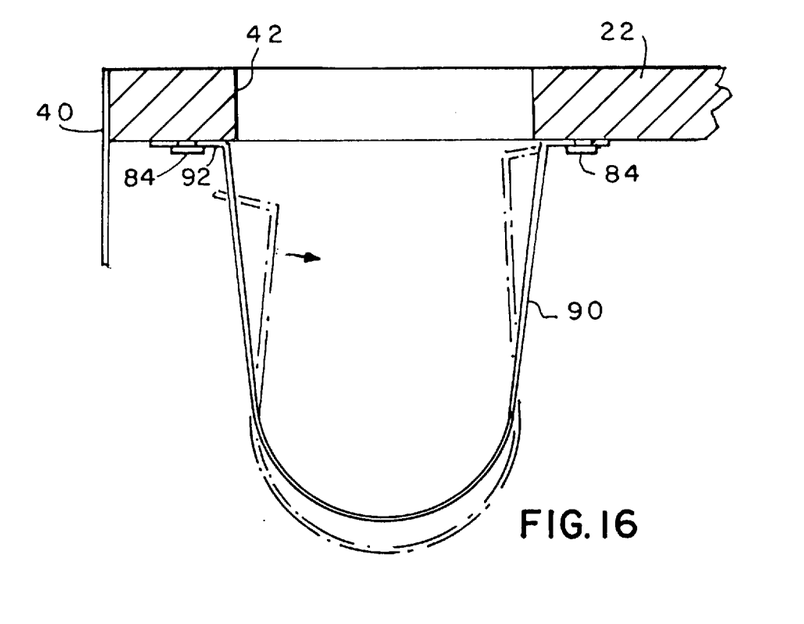
FIG. 16 is a side elevational view in section, of a portion of the table and slot extending thereto showing the snap-in trough thereunder.

An arrangement of rivets 84 are attached to the lower side of the table 22, adjacent to the elongated slot 42, as shown in FIG. 16. A generally U-shaped trough 90, having an L-shaped shoulder 92 along each upper edge thereof, is flexibly arranged so as to snap into engagement with the spaced apart rivets 84 on the bottomside the table 22 to which they are attached. The snap-in trough 90 has a wall 92 at each end, so as to provide an enclosed dust and debris receptacle beneath the router 58 and the table 22, while also providing an enclosure for suction to be applied, from the vacuum.

A power receptacle 94 with an on/off switch, is attached to the lower side of the table 22 at one end thereof, as may be seen in FIG. 2. The power receptacle 94 has an extension cord 96 to provide electrical power to the receptacle 94 from a power source. The receptacle 94 has electrical cords 98 and 100 which run to the router 58 alongside its hose 74 on the top of the table 22 and to an on/off switch connected to the vacuum cleaner 82 supported on the frame 24 beneath the table 22.

A pair of brackets 102 are arranged between spaced apart transverse members between the legs 26, so as to permit the vacuum container 82 to be secured in a vertical orientation therebetween, as may be seen in FIGS. 1 and 2. A bungee cord may be utilized to hold the vacuum container 82 to those brackets 102. The brackets 102 are movable so as to allow the vacuum container 82 to be supported directly under the table 22, or under the distal edge 36.

In a further embodiment, the vacuum container 82 may be disposed in a horizontal arrangement with the bungee cord holding the vacuum container 82 to lower frame components as shown in FIG. 2.

A locking knob 110 may be arranged through a side of the carriage base 50, so as to lock the carriage base 50 and the router 58 into a particular longitudinal location on the guiderail assembly 44. The outermost guiderail may have ruled graduations 112 marked on its uppermost surface to permit the measured adjustment of tiles being cut thereby, as may be seen in FIG. 17. The locking knob 110 also permits the router assembly 58 to be fixedly locked thereon, permitting a tile "T" to be pushed with respect to the stationary router 58 itself, instead of the router 58 being pushed with respect to a tile "T" thereunder.

Figure 6:
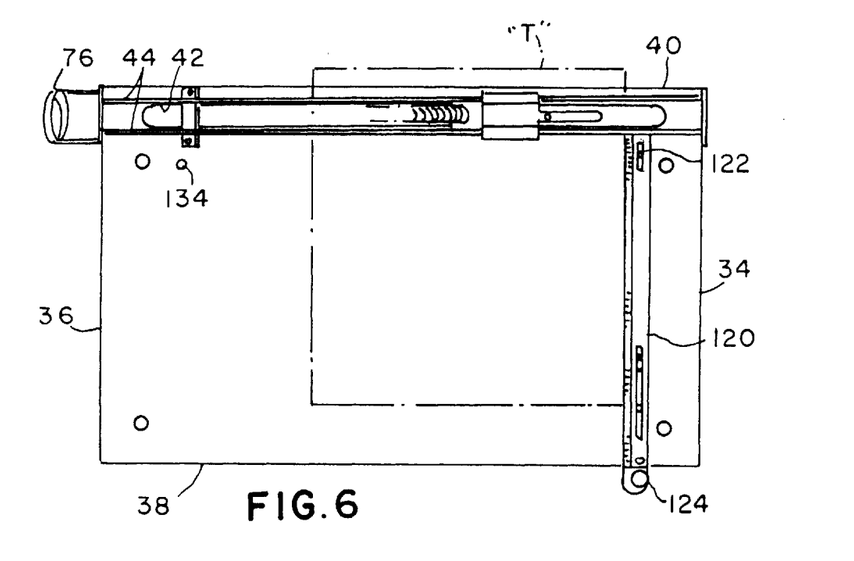
FIG. 6 is a plan view showing the table, the rail guide, router and adjustable rule in a non-angled configuration, with a tile shown thereon in phantom.
Figure 7:
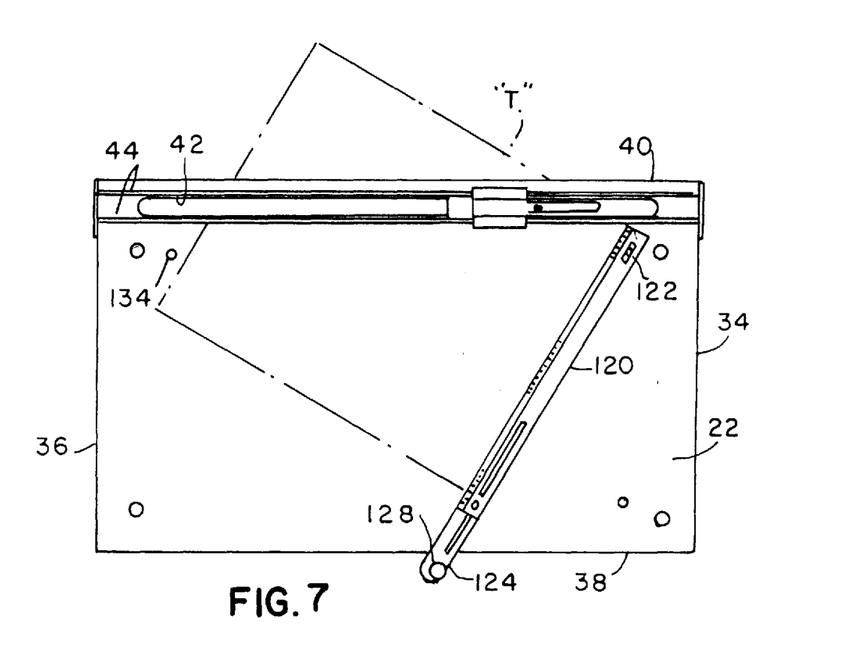
FIG. 7 is plan view similar to that of FIG. 6, wherein the adjustable rule is arranged at an angle with respect to the side edge of the table, showing a tile in phantom subject to being cut at an acute angle.
Figure 9:
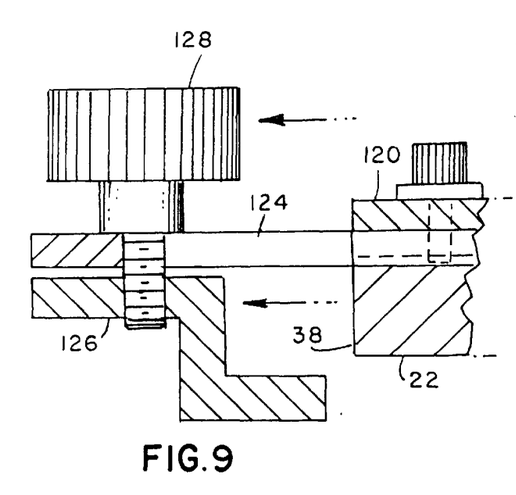
FIG. 9 is a side elevational view partly in section of the left side edge of the table and the distal end of the adjustable rule with its locking arrangement spaced therefrom.
Figure 10:
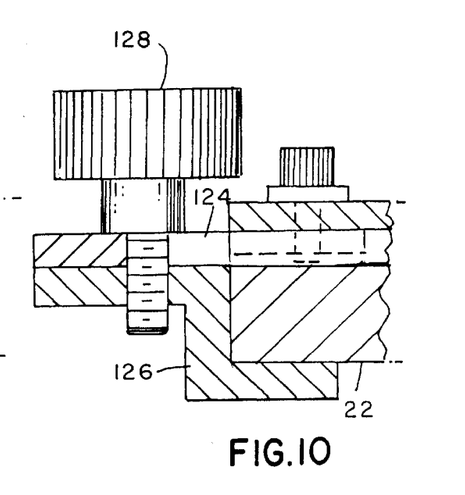
FIG. 10 is a view similar to that shown in FIG. 9, with the distal end of the adjustable route and bracket locked tightly onto the left side edge of the table.
Figure 11:
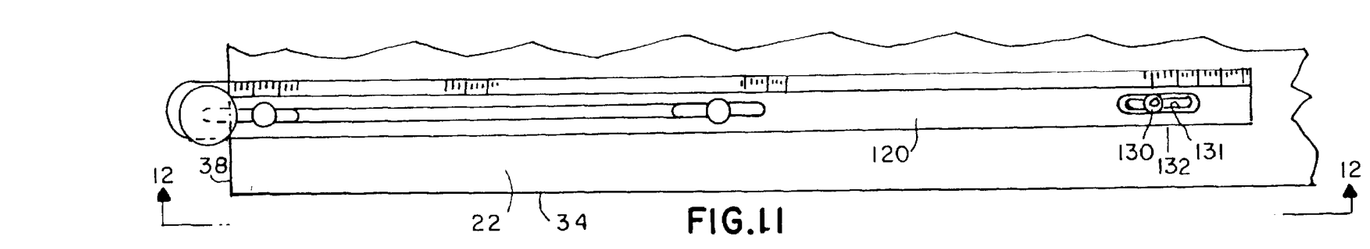
FIG. 11 is a plan view showing the adjustable rule arranged adjacent to the first or proximal edge of the table.
Figure 12:
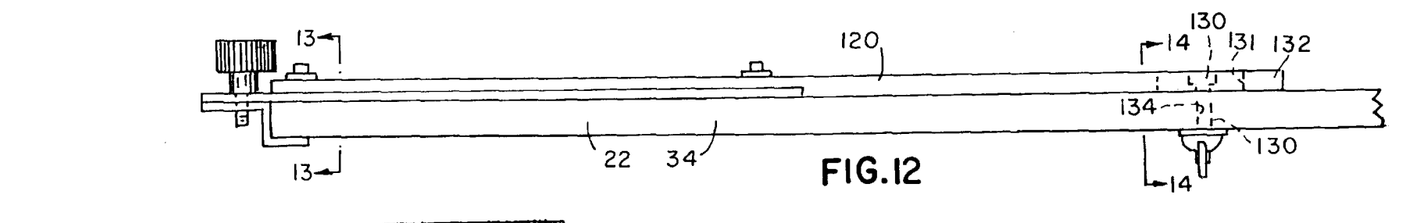
FIG. 12 is a view taken along the lines 12—12 of FIG. 11.
Figure 13:
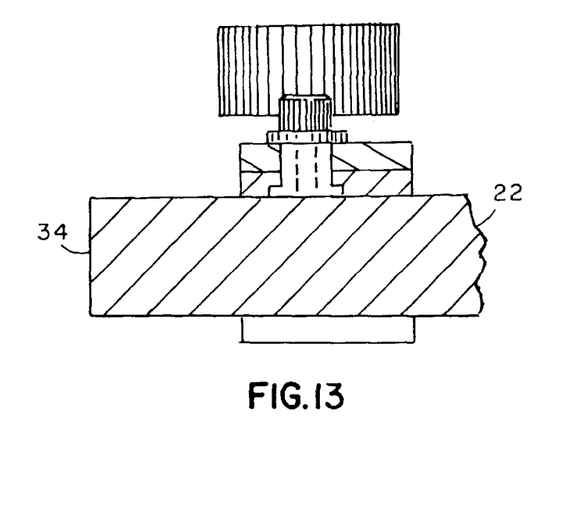
FIG. 13 is a sectional view taken along the lines 13—13 of FIG. 12.
Figure 14:
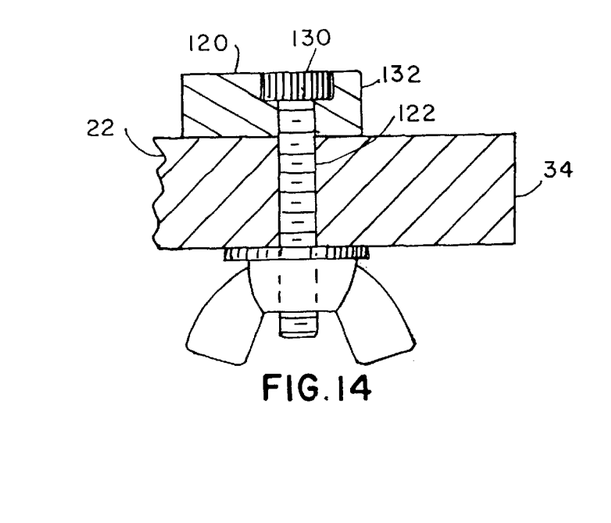
FIG. 14 is a sectional view taken along the lines 14—14 of FIG. 12.

A telescopable adjustable rule 120 is arrangeable, generally parallel to the first or proximal edge 34 of the table 22, as may be seen in FIGS. 6, 7 and 11. The telescopable rule 120 is pivotally attached at a first location 122 at the right-hand side of the table 22, adjacent to the rail guide 44. The adjustable rule 120 has a distal end 124 with a z-bracket 126 thereon, as shown in FIGS. 9 and 10. A locknut 128 is disposed through the distalmost end 124 of the lower side of the adjustable rule 120, and into the z-bracket 126, so as to lock the z-bracket 126 against the lower edge of the table 22, as may be seen in FIG. 10.

Figure 8:
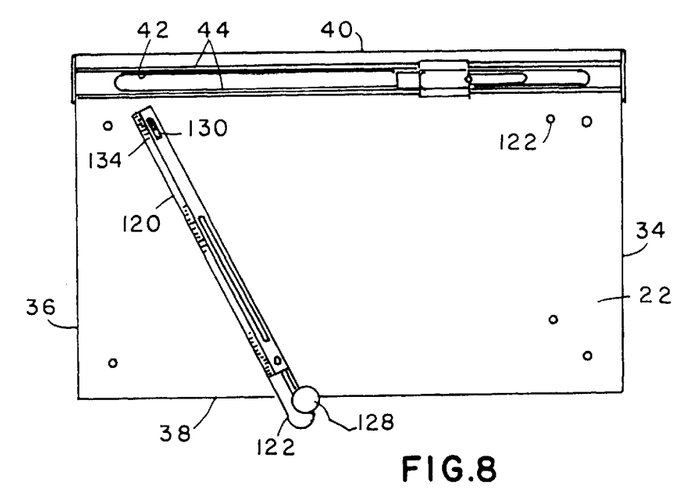
FIG. 8 is a plan view of the table, similar to that of FIG. 7, showing the adjustable rule in a different location on the table.

The adjustable rule 120 has a pin 130 which extends through a slot 131 on its proximal end 132, which pin 130 is insertable through a corresponding mating hole 134 alongside the rail guide 44. The adjustable rule 120 may be placed at second hole 134' (or other locations) on the upper surface of the table 22, by implacement of its pivot pin 130 therein, as shown in FIG. 8.

The adjustable rule 120, may therefore be locked into any angular orientation on the table 22, from a position adjacent to the first or proximal edge 34, or from a position adjacent to the distal or second edge 36 thereof.

By locking in the adjustable rule 120 utilizing the lock knob 128 and the z-bracket 126 thereat, successive corresponding angular cuts may be made by moving the router 58 along the rail guide 44 while a tile "T" is held in place at the angular disposition of the rail guide 44. The slot 131 permits the proximal end 132 of the telescoping adjustable rule 120 to be adjustably movable, and hence still be calibrated with respect to the router 58, even when the adjustable rule 120 is pivoted to an angle of 45° from parallel with the proximal edge 34 of the table 22.

The carriage base 50 and router assembly 58, by virtue of its lock knob 110 tightenable against the rail guide assembly 44, may permit the router assembly 58 to be locked at any particular location thereacross. The lock knob 110 in one embodiment may tighten just an auxialiary bracket 150 to the rail guide 44. The auxiliary bracket 150 itself, is however securable to the carriage base 50 through an arrangement of thumb screws 152 tightenable through elongated slots 154 in the auxiliary bracket 150, as shown figure18. The carriage base 50 itself may be tightened onto the rail guide 44, or just permit the auxiliary bracket 150 by itself to be tightened against the rail guide 44. This allows the carriage base 50 to be moved the length of the slots 154, to permit a change of position of the router 58 slightly, to increments on the rail guide 44, to allow the machine operator to accurately calibrate the router 58 for different cutter tools 68 (diameter, size etc) in relation to the calibrations 112 on the rail guide 44 and to accomodate different reveal edges or cuts in the tiles "T". Changes in cuts or reveal edges may also be accomplished by adjusting the vertical height of the cutter tool 68, by adjustment of the screw 64 in the router 58, with respect to the slot 62 in the support bracket 60, as shown in FIG. 5. The adjustable rule 120 may be locked against the left-hand side edge 38 of the table 22, the tiles "T" themselves, may therefore be slid across the adjustable rule 120 so as to permit the tiles "T" to be moved with respect to the router and not the router 58 with respect to the tiles "T".

Figure 17:
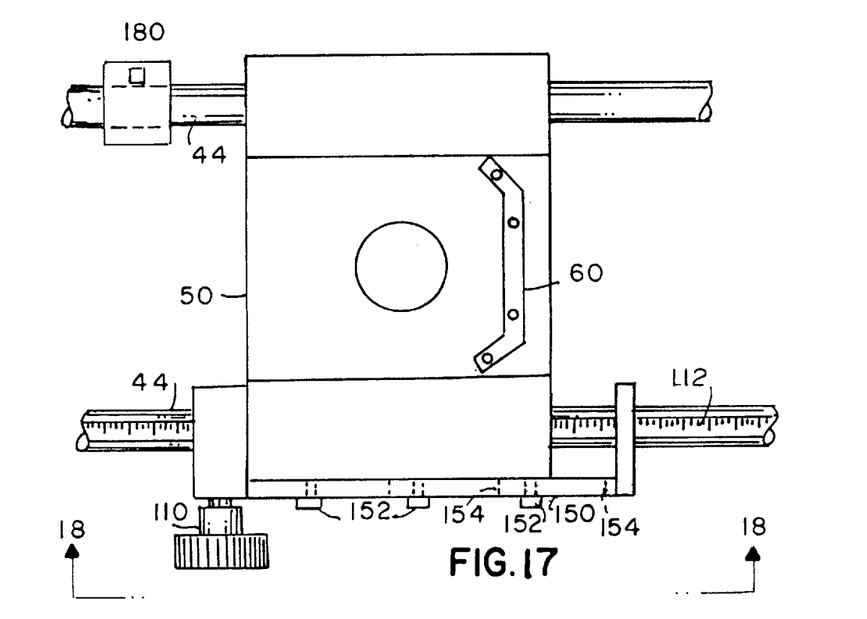
FIG. 17 is a plan view of a portion of the rail guide assembly and the carriage base, the side rail of the rail guide assembly having its graduations arranged thereon.
Figure 18:
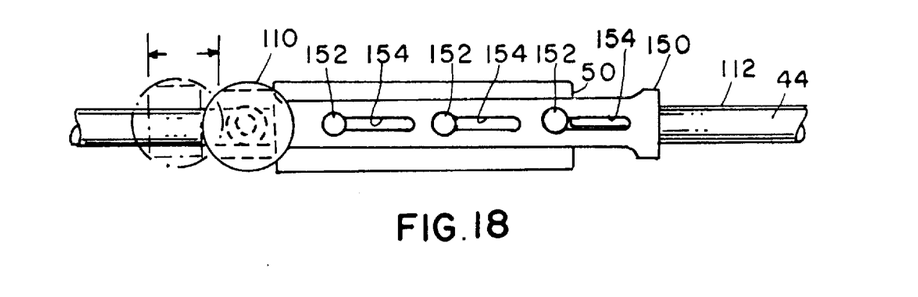
FIG. 18 is a view taken along the lines 18—18 of FIG. 17, showing a secondary adjustment bracket for the carriage base and associated cutting tool.
Figure 19:
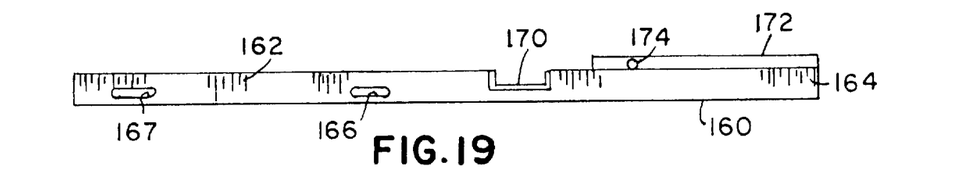
FIG. 19 is a plan view of an alternative embodiment of the adjustable rule, which permits measurement and support of tiles beyond the side edge of the table.

A further embodiment of the adjustable rule is shown in FIG. 19, wherein an extended rule 160 is shown, having a pair of separate graduated scales 162 and 164 thereon. A slot 166 is cut through the rule 160 for insertion of a locking pin (not shown for clarity), which however, would be similar to the pivot pin 130 shown in FIG. 14. A second slot 167 is also cut therethrough, for alignable securement to the table 22, by a further pin, not shown. The slots 166 and 167 permit the extended rule 160 to adjust its location to compensate for the particular tool cutter 68 being used in the router 58. The extended rule 160 has a shouldered cut-out 170 between the respective graduated scales 162 and 164, to permit the cutter tool 68 to make an accurate and complete cut of a tile when the router is moved proximally (and close to) towards the extended rule 160. The extended rule 160 may also have a lower lip 172 extending from a lower side thereof, as shown in FIG. 19, to help support any small piece of tile being cut, which tile extends over the side edge 40 of the table 22. An adjustable screw "stop" 174 may be tightenable along the lower lip 172 to thus permit succesive accurate cuts of the same dimension to many pieces of tile. A second adjustable stop 180 is arranged on on of the guide rails 44 as shown in FIG. 17, to set a desired limit on the travel of the base 50.

I claim:

1. A ceiling tile cutting apparatus for the cutting and edging of successive tiles with corresponding angular cuts in a corresponding manner, said apparatus comprising:

a plurality of vertically arranged support legs connected by a plurality of horizontal members;

a planar table member of generally rectilinear configuration attached at the upper end of said support legs, said table member having a first or proximal edge, a second or distal edge parallel to said first edge, a left hand edge and a right hand edge generally parallel to said left edge;

an elongated slot extending through said table member parallel to said right hand edge of said table member;

a pair of guide rails supported over said elongated slot;

a motorized cutting tool mechanism arranged to slide on a carriage base mounted on said guide rails, with a cutting tool extending into said slot;

an adjustable ruler pivotably arranged on said table, said ruler having an arrangement of elongated slots therein, one of said slots at a first pivot axis location with a pivot pin therein, and a second pivot axis location in said table to permit said adjustable ruler to be adjustable both longitudinally with respect to said pivot pin and to guide tiles on said table from a plurality of base locations and allow tiles to be cut more efficiently, wherein said adjustable ruler comprises a further rule and has a first and a second end, said second end arranged to extend over the right hand side of said table to permit repetitive identical cuts in small pieces of tile without re-measurement of each successive cut; said adjustable ruler having two separate graduated scales thereon, each of said scales increasing from a common point on said rule outwardly, to permit measurement to the left and right from said common point, said common point comprising a cutout on an edge of said adjustable ruler, said common point also being in alignment with a cutter on said cutting tool mechanism when said cutting tool mechanism slides on said rail guide.

2. The ceiling tile cutting apparatus as recited in claim 1, including:

a flexible hose attached to a base of said cutting tool mechanism, said flexible hose connected to a vacuum member;

a bracket arranged at each end of said guide rails to connect said rails to said first and second edges of said table member;

a flexible hose-support attached to said bracket at said second edge of said table member, said hose-support longitudinally centered on said guide rails to receive said vacuum hose therethrough from said tool cutting mechanism, and permit said vacuum hose to move slightly during operation of said cutting tool mechanism.

3. The ceiling tile cutting apparatus as recited in claim 1, including:

a flexible trough releasably attached to the lower side of said table adjacent said elongated slot, to permit said trough to be flexed for removal from securement brackets adjacent the lower side of said elongated slot.

4. The ceiling tile cutting apparatus as recited in claim 1, including:

a locking nut arrangement between said tool cutting mechanism and said guide rails to permit said tool cutting mechanism to be locked stationary onto said guide rails, and a tile moved relative thereto, to permit a two axis cutter whereby to cut tiles which move or to cut stationary tiles by a movable cutter.

5. The ceiling tile cutting apparatus as recited in claim 4, including:

a graduation rule arranged on one of said guide rails so as to permit accurate setting and repeatability of locating said cutting tool mechanism thereon.

6. The ceiling tile cutting apparatus as recited in claim 1, wherein said cutting tool mechanism comprises a carriage base arranged to slide on said guide rails, said base having a mounting bracket thereon which permits vertical adjustability of a router tool with respect to said bracket.

7. The ceiling tile cutting apparatus as recited in claim 6, wherein said carriage base has a hose adapter plate attached thereto, to permit said vacuum hose to be held adjacent the cutting tool as it moves on said guide rails, so as to maximize any dust and debris pickup thereby.

8. The ceiling tile cutting apparatus as recited in claim 1, including a vacuum generator which is supportable in a nesting orientation in a frame assembly beneath said table, or in an upright orientation adjacent said support frame on a pair of brackets secured to said frame assembly.

9. The ceiling tile cutting apparatus as recited in claim 1, wherein said carriage base has a further bracket secured to one of said guide rails, said further bracket being adjustably securable to said carriage base to permit controlled incremental adjustment of the location of said cutting tool mechanism and hence controlled incremental adjustment in the dimension of cuts made by said cutter mechanism.

10. The ceiling tile cutting apparatus as recited in claim 1, wherein said further rule has a lip extending off of a lower edge thereof, so as to provide a support surface to small pieces of tile being cut on said apparatus.

11. The ceiling tile cutting apparatus as recited in claim 10, including an adjustable stop screw secured to said lip, to provide a limit point to tiles slid along said further rule, facilitating accurate repeatability of dimensions to successively cut tiles by said cutting tool mechanism.

12. A method of cutting successive ceiling tiles in a common manner, comprising the steps of:

supporting a table on a frame assembly;

forming an elongated slot through said table along one side edge thereof;

mounting an adjustable cutting tool assembly on a pair of guide rails supported above said elongated slot in said table;

arranging an adjustable telescopable rule on said table to guide a tile therealong at a particular desired angle with respect to said guiderails;

locking stationary said cutting tool assembly onto said guide rails at a particular location;

pushing a tile to be angularly cut along said adjustable telescopable rule and under said guide rails with said cutting tool assembly thereon, so as to move said tile with respect to said stationary cutting tool assembly to permit successive tiles to be cut at the same angle;

moving said adjustable rule to a second pivot location on said table, so as to permit said adjustable rule to pivot thereon from a different location, and allow a different cut to be made into a tile;

attaching a vacuum hose to said cutting tool assembly, and a trough under said elongated slot in said table, so as to vacuum dust from said cutting operation as a tile is pushed thereadjacent; and flexing said trough so as to remove said trough from attachment to said table, so as to permit the complete removal of any dust not vacuumed through said hose.

13. The method of cutting successive ceiling tiles in a common manner as recited in claim 12, including the steps of:

unlocking said stationary cutting tool from said locked position and pulling said cutting tool along said guide rails against a stationary tile thereunder.

14. The method of cutting successive ceiling tiles in a common manner as recited in claim 13, including the step of:

adjusting said rule with respect to a location on said table by loosening a pivot pin in a slot in said rule to permit said rule to be moved longitudinally with respect to said table.

* * * * *